United States Patent
Yamaya

(10) Patent No.: US 9,971,273 B2
(45) Date of Patent: May 15, 2018

(54) IMAGE FORMING APPARATUS

(71) Applicant: CANON KABUSHIKI KAISHA, Tokyo (JP)

(72) Inventor: Fumihiko Yamaya, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/363,225

(22) Filed: Nov. 29, 2016

(65) Prior Publication Data

US 2017/0153567 A1 Jun. 1, 2017

(30) Foreign Application Priority Data

Nov. 30, 2015 (JP) ................. 2015-232708

(51) Int. Cl.
| G03G 15/04 | (2006.01) |
| G03G 15/043 | (2006.01) |
| G02B 26/12 | (2006.01) |

(52) U.S. Cl.
CPC ......... *G03G 15/043* (2013.01); *G02B 26/127* (2013.01)

(58) Field of Classification Search
CPC ............. G03G 15/043; G03G 15/0435; H04N 1/1916; H04N 1/1135; G02B 26/125; G02B 26/127
See application file for complete search history.

(56) References Cited

U.S. PATENT DOCUMENTS

| 7,688,342 B2 | 3/2010 | Sobue | |
| 2004/0032483 A1* | 2/2004 | Itabashi | B41J 2/473 347/238 |
| 2012/0062683 A1* | 3/2012 | Fujita | G02B 26/127 347/118 |
| 2013/0229696 A1* | 9/2013 | Takikawa | G03G 15/043 358/474 |
| 2015/0077496 A1* | 3/2015 | Yamada | G03G 15/043 347/118 |
| 2015/0248076 A1* | 9/2015 | Fujino | G03G 15/043 347/118 |
| 2017/0280001 A1* | 9/2017 | Furuta | H04N 1/2346 |

FOREIGN PATENT DOCUMENTS

| JP | S6488516 A | 4/1989 |
| JP | 2007078723 A | 3/2007 |
| JP | 2007286129 A | 11/2007 |
| JP | 2008116664 A | 5/2008 |
| JP | 2013097034 A | 5/2013 |

\* cited by examiner

*Primary Examiner* — Clayton E Laballe
*Assistant Examiner* — Ruifeng Pu
(74) *Attorney, Agent, or Firm* — Rossi, Kimms & McDowell LLP

(57) ABSTRACT

An image forming apparatus includes an optical scanning unit including a rotatable polygonal mirror, a detecting portion, and a slit; and a controller. The slit includes a first portion where a slit width is a first width with respect to a main scan direction and a second portion, different in position from the first portion with respect to a sub-scan direction, where the slit width is a second width different from the first width with respect to the main scan direction. The controller identifies one of reflecting surfaces of the rotatable polygonal mirror as a reference surface on the basis of a plurality of detected signals acquired by detecting a plurality of light beams which are deflected by the respective reflecting surfaces and which pass through the slit.

5 Claims, 11 Drawing Sheets

IMAGE FORMING APPARATUS

FIELD OF THE INVENTION AND RELATED ART

The present invention relates to an image forming apparatus including an optical scanning device for scanning a photosensitive member with a light beam deflected by a rotatable polygonal mirror.

An optical scanning device for use with a conventional image forming apparatus such as a laser printer optically modulates a laser light beam emitted from a light source depending on an image signal, and the photosensitive member is subjected to deflection scanning with the optically modulated laser light beam by an optical deflector provided with a rotatable polygonal mirror.

In the optical scanning device, a plurality of reflecting surfaces of the rotatable polygonal mirror includes a reflecting surface which is not parallel with a rotational axis in some cases due to cutting accuracy during manufacturing and assembling accuracy during assembling of the rotatable polygonal mirror with the optical scanning device (so-called face inclination (tilt)). In a state in which the face inclination generates, when the photosensitive member is subjected to deflection scanning with the laser light beam, a phenomenon that a scanning position of the laser light beam steadily deviates from a target position generates periodically, so that a variation in interval between scanning lines generates. Further, it is difficult to process the respective reflecting surfaces in a complete flat surface in a cutting process, so that a curved surface or the like is formed as a part of the reflecting surfaces in some cases. In this state, in the case where the laser light beam is used for the deflection scanning. A phenomenon that the scanning position of the laser light beam steadily deviates from a target position with respect to a main scan direction for each of the respective reflecting surfaces periodically generates (so-called jittering). In order to eliminate these phenomena, cutting (process) accuracy may only be required to be improved, but there is a problem that a processing cost increases.

In order to solve the above-described problems, Japanese Laid-Open Patent Application (JP-A) 2007-286129 has proposed a technique in which a reflecting surface of a rotatable polygonal mirror is identified and a variation in interval between scanning lines is electrically corrected. Specifically, in the technique proposed in JP-A 2007-286129, a magnetic is mounted to a lower portion of the reflecting surface and the reflecting surface of the rotatable polygonal mirror is identified by Hall element positioned below the rotatable polygonal mirror. Further, JP-A 2007-78723 has proposed a technique in which a reflecting surface of a rotatable polygonal mirror is identified from a phase relationship between a writing position signal (BD signal) used for writing position control and a rotation angle signal (FG signal) used for rotation control of the rotatable polygonal mirror.

However, in the technique of JP-A 2007-286129, in order to identify the reflecting surface of the rotatable polygonal mirror, the rotatable polygonal mirror is provided with the magnet, the Hall element and the like, and therefore, the number of parts increases and a manufacturing step is complicated, so that a cost increases.

Further, in the technique of JP-A 2007-78723, there is a problem that when the number of BD signals detected during one rotation of the rotatable polygonal mirror and the number of FG signals detected during one rotation of the rotatable polygonal mirror are not in a prime (number) relationship, the reflecting surface cannot be uniquely identified.

SUMMARY OF THE INVENTION

A principal object of the present invention is to provide an image forming apparatus capable of simply identifying a reflecting surface (reflecting facet) of a rotatable polygonal mirror.

According to an aspect of the present invention, there is provided an image forming apparatus comprising: an optical scanning unit configured to scan a photosensitive member with a light beam, wherein the optical scanning unit includes a rotatable polygonal mirror configured to deflect the light beam emitted from a light source, a detecting portion configured to detect the light beam deflected by the rotatable polygonal mirror, and a slit provided between the rotatable polygonal mirror and the detecting portion and configured to regulate the light beam toward the detecting portion; and a controller configured to control, on the basis of a detected signal by the detecting portion, a scanning start position of the photosensitive member with the light beam deflected by the rotatable polygonal mirror, wherein the slit includes a first portion where a slit width is a first width with respect to a main scan direction and a second portion, different in position from the first portion with respect to a sub-scan direction, where the slit width is a second width different from the first width with respect to the main scan direction, and wherein the controller identifies one of reflecting surfaces of the rotatable polygonal mirror as a reference surface on the basis of a plurality of detected signals acquired by detecting a plurality of light beams which are deflected by the respective reflecting surfaces and which pass through the slit.

Further features of the present invention will become apparent from the following description of exemplary embodiments with reference to the attached drawings.

DESCRIPTION OF THE EMBODIMENTS

Embodiments of the present invention will be described specifically with reference to the drawings. However, dimensions, materials, shapes and relative arrangement of constituent elements described in the following embodiments are not intended such that the scope of the present invention is limited only thereto unless otherwise specified.

First Embodiment

Figure 1:
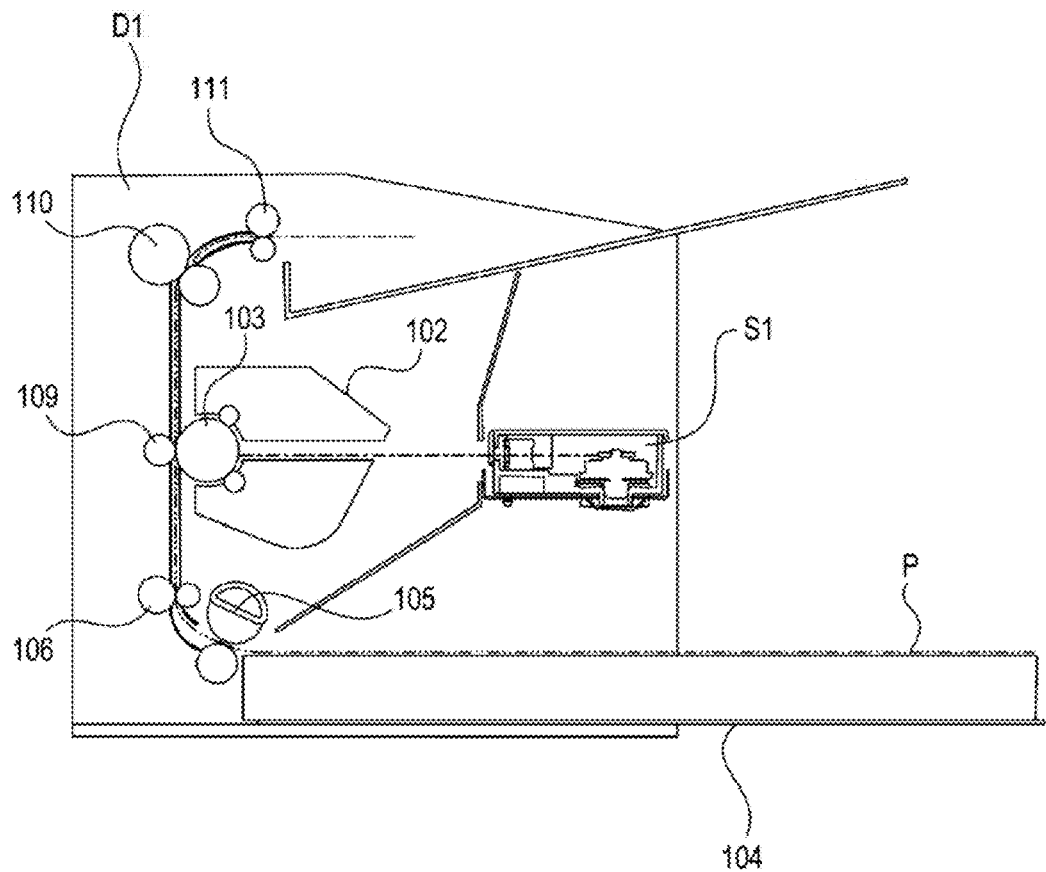
FIG. 1 is a schematic sectional view of an image forming apparatus according to First Embodiment.

FIG. 1 is a schematic sectional view of an image forming apparatus D1 including an optical scanning device S1. The image forming apparatus D1 is provided with the optical scanning device S1, and an image bearing member such as a photosensitive drum is scanned by the optical scanning device S1, and then an image is formed on a recording material such as recording paper on the basis of a scanned image. As shown in FIG. 1, a laser light beam on the basis of image information is emitted from the optical scanning device S1 as an exposure means, and a photosensitive drum 103 as the image bearing member (photosensitive member) incorporated in a process cartridge 102 is scanned with this light beam. The photosensitive drum 103 is exposed to the light beam, so that a latent image is formed on the photosensitive drum 103. The latent image is visualized with toner by a developing means in the process cartridge 102. The process cartridge 102 integrally includes the photosensitive drum 103 and as process means actable on the photosensitive drum 103, such as a charging means and the developing means.

On the other hand, a recording material P stacked on a recording material stacking plate 104 is fed by a feeding roller 105 while being separated one by one, and then is conveyed toward a downstream side by a conveying roller 106. Onto the conveyed recording material P, the toner image formed on the photosensitive drum 103 is transferred by a transfer roller 109. The recording material P on which this unfixed toner image is formed is further fed toward the downstream side and is heated by a fixing device 110 including a heating member therein. As a result, the toner image is fixed on the recording material P. Thereafter, the recording material P is discharged to an outside of the image forming apparatus by a discharging roller 111.

In this embodiment, as the process means actable on the photosensitive drum 103, the charging means and the developing means are integrally assembled with the photosensitive drum 103 into the process cartridge 103, but the respective process means may also be constituted as separate members from the photosensitive drum 1.

Figure 2:
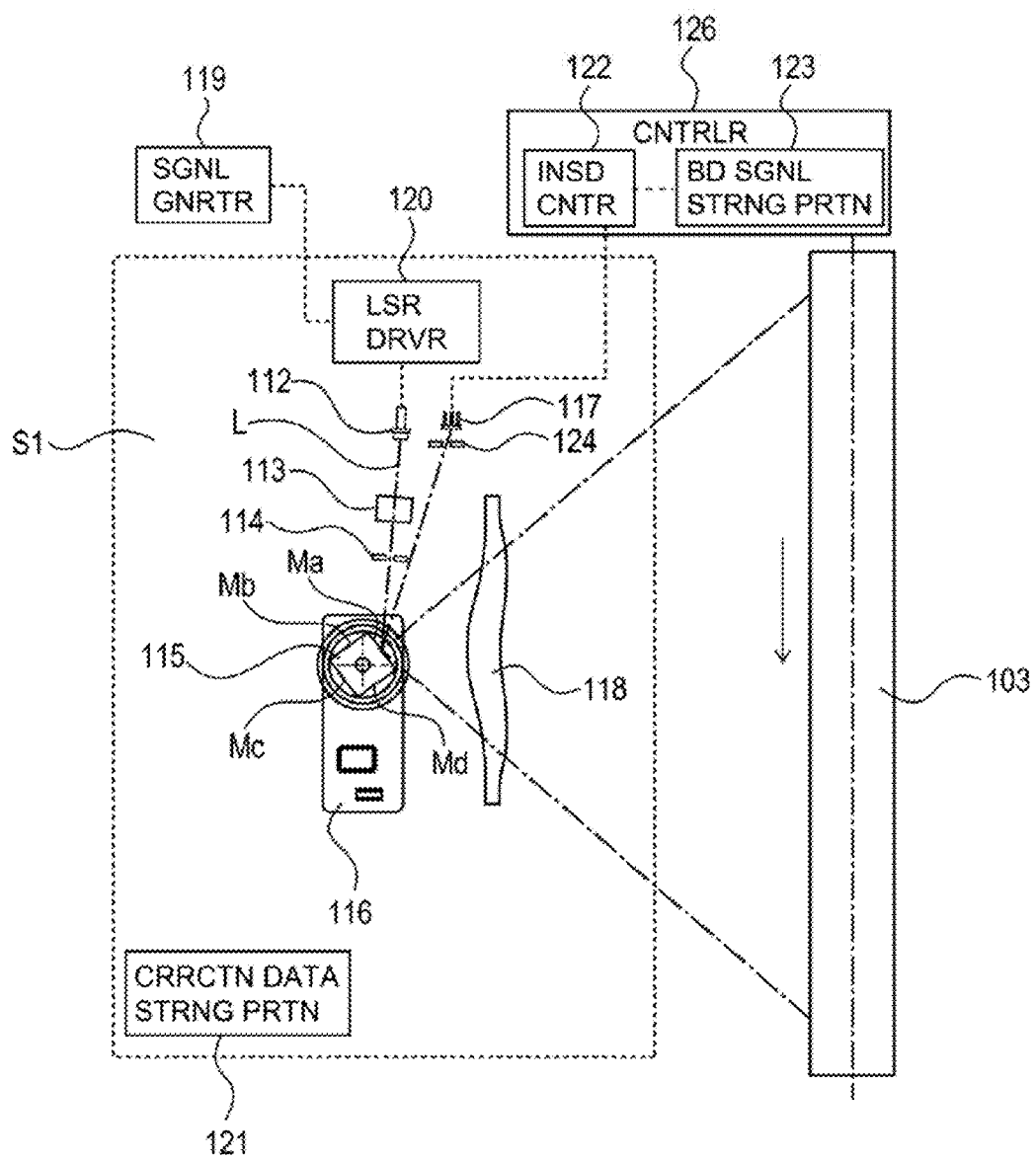
FIG. 2 is a schematic view showing an optical scanning device and an exposure controller in First Embodiment.

Next, the optical scanning device S1 will be described with reference to FIG. 2. FIG. 2 is an illustration showing a constitution of the optical scanning device S1 and an exposure controller.

In FIG. 2, the optical scanning device S1 includes a semiconductor laser (light source) 112 for emitting a laser light beam, an anamorphic collimator lens 113 prepared by integrally molding a collimator lens and a cylindrical lens, an aperture step 114, a rotatable polygonal mirror 115, a light reflector 116 for rotationally driving the rotatable polygonal mirror 115, a writing position synchronizing signal detecting sensor (BD sensor) 117 using a photo-sensor, an fθ lens (scanning lens) 118 and a slit 124.

In FIG. 2, an image signal generating portion 119 forms an image signal, and a laser driving portion 120 drives the light source (semiconductor laser) 112. An inside counter 122 for measuring an output pulse width of a BD signal outputted from the BD sensor 117, and a BD signal storing portion 123 for storing the output pulse width of the BD signal. A controller 126 includes the inside counter 122 and the BD signal storing portion 123 and identifies a reflecting surface as a reference surface of the rotatable polygonal mirror 115 on the basis of the BD signal as described later.

In the above-described constitution, a laser light beam L emitted from the light source 112 is changed into a substantially converging beam in a main scanning cross-section and is changed into a converging beam in a sub-scanning cross-section by the anamorphic collimator lens 113. Then, the laser light beam L passes through the aperture stop 114 and a light beam width is limited, so that the laser light beam L is formed as a substantially line image (a longitudinal line image with respect to a main scan direction) on a reflecting surface M of the rotatable polygonal mirror 115. The rotatable polygonal mirror 115 has a plurality of reflecting surfaces. In this embodiment, the rotatable polygonal mirror 115 having four reflecting surfaces Ma, Mb, Mc, Md is shown as an example. The laser light beam L is used for deflection scanning by rotating the rotatable polygonal mirror 115. The laser light beam L is reflected by the reflecting surface M of the rotatable polygonal mirror 115 and passes through a slit 124 and thus is incident on the BD sensor 117. At this time, the BD sensor (position detecting means) 117 outputs a signal (BD signal) to the controller (control means) 126. The controller 126 uses timing of the BD signal outputted for each of the reflecting surfaces as synchronization detection timing of a writing signal with respect to the main scan direction. That is, the controller 126 controls, on the basis of a detected signal by the BD sensor 117, a scanning start position of the photosensitive drum with each light beam L deflected by the plurality of reflecting surfaces M.

The signal detection by the BD sensor 117 is made at each of the reflecting surface Ma, Mb, Mc, Md of the rotatable polygonal mirror 115. At that time, an output pulse width of the BD signal is measured by the inside counter 122 of the controller 126 and is stored in the BD signal storing portion 123 in advance. Then, the laser light beam L enters the fθ lens 118. The fθ lens 118 is designed so that the laser light beam L is focused so as to form a spot on the photosensitive drum and so that a scanning speed of the spot is maintained at an equal speed. In order to obtain such a characteristic of the fθ lens 118, the fθ lens 118 is formed with an aspherical lens. The laser light beam L passed through the fθ lens 118 is formed as an image on the photosensitive drum 103 and thus the photosensitive drum 103 is scanned with the laser light beam L.

By the rotation of the rotatable polygonal mirror 115, the laser light beam L is used for the deflection scanning, so that main scanning of the photosensitive drum 103 with the laser light beam L is made. Further, sub-scanning is made by rotationally driving the photosensitive drum 103 about a cylindrical axis thereof. Thus, on the surface of the photosensitive drum 103, an electrostatic latent image is formed. Here, a scanning direction (axial direction of the photosensitive drum) of the photosensitive drum with the laser light beam L by the rotation of the rotatable polygonal mirror 115 is the main scan direction. On the other hand, a scanning direction which is perpendicular to the main scan direction and along which sub-scanning is made by the rotational drive of the photosensitive drum around the cylindrical axis of the photosensitive drum is a sub-scan direction.

The optical scanning device S1 includes a correction value data storing portion (semiconductor memory) 121. In the correction value data storing portion 121, correction value data on the basis of individually different various pieces of characteristic information are stored in advance during factory shipment. In the correction value data storing portion 121, principally, laser light beam irradiation position information on the photosensitive drum such as jitters associated with the respective reflecting surfaces measured before the factory shipment and simple information on how to identify the reference surface using what identifying method are associated with each other and are written. Specifically, during inspection before the factory shipment, the above-described irradiation position information is measured for each of the reflecting surfaces of the rotatable polygonal mirror 115 simultaneously with measurement of the BD signal pulse width for each of the reflecting surfaces. From the information of the measured BD signal pulse widths, of the plurality of reflecting surfaces of the rotatable polygonal mirror 115, a surface (facet) providing a largest pulse width is defined as a reference surface Facet 1. In the correction value data storing portion 121, irradiation position information assigned for each reflecting surface in the order of a rotational direction of the rotatable polygonal mirror 115 on the basis of the Facet 1 and a reference surface identifying method such that the surface providing the largest pulse width is defined as the Facet 1 are stored in advance.

Incidentally, a constitution in which the optical scanning device S1 is not provided with the semiconductor memory or the like as the correction value data storing portion may also be employed. In this case, the above-described information is written in a two-dimensional bar code or the like and is pasted on the optical scanning device S1 in advance. Then, during assembling of the optical scanning device S1 with the image forming apparatus D1, it is only required that information of the bar code is transferred by using a barcode reader to an unshown information storing portion provided in the image forming apparatus D1.

Figure 3:
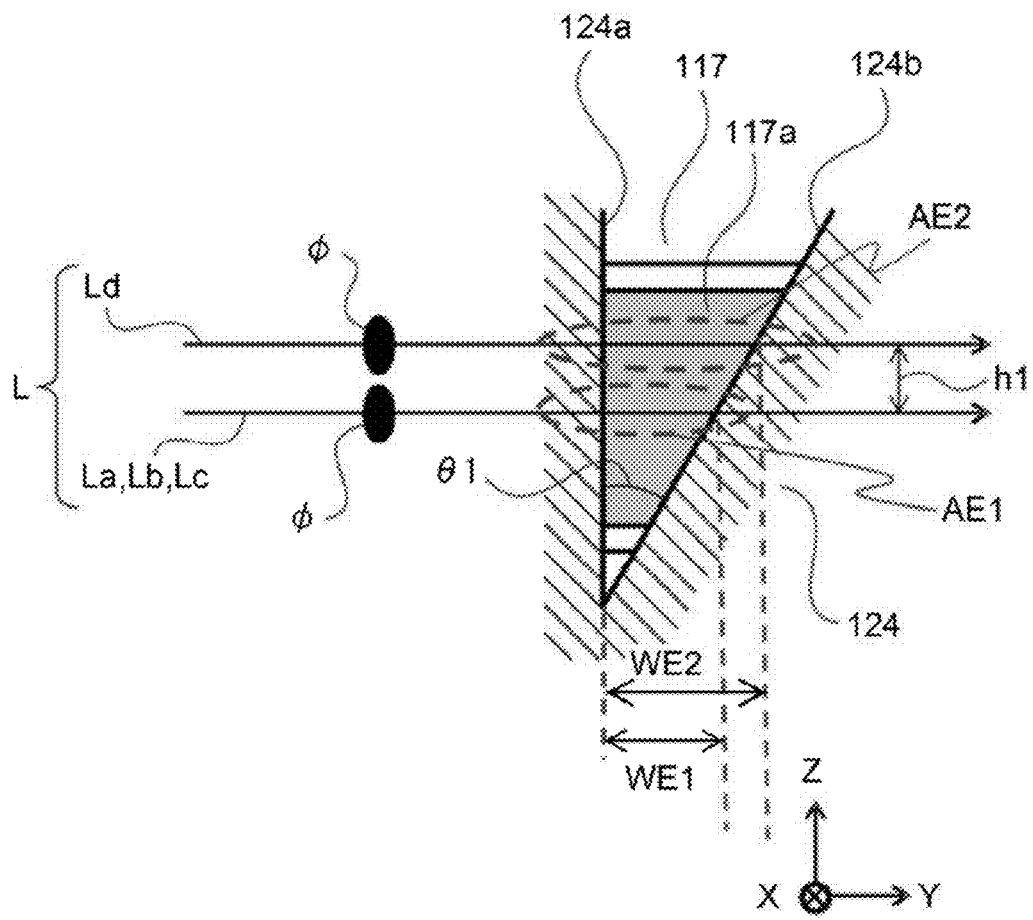
FIG. 3 is an illustration of a structure of a BD sensor and a slit.
Figure 4:
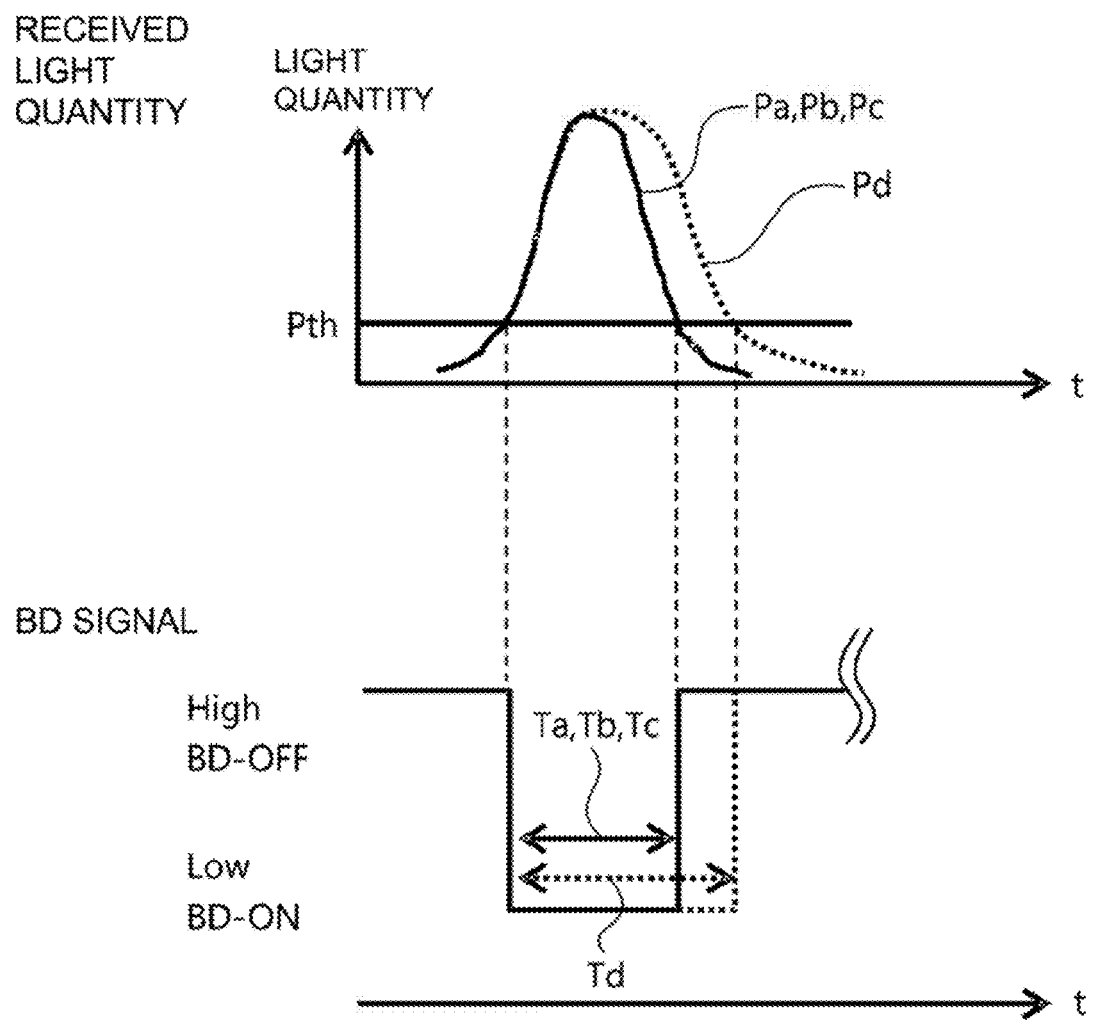
FIG. 4 is an illustration of a BD signal in First Embodiment.

Next, a constitution of identifying a single reflecting surface (reference surface) of the plurality of reflecting surfaces will be described with reference to FIGS. 3 and 4. FIG. 3 is an illustration of a constitution of the BD sensor 117 and the slit 124 in the optical scanning device S1. FIG. 4 is an illustration of the BD signal.

Identification of the single reflecting surface (reference surface) from the plurality of reflecting surfaces is made by the controller 126 on the basis of the detected signal from the BD sensor 117. In this embodiment, by a simple constitution shown below, the identification of the reflecting surface as the reference surface by the controller 126 is realized.

As shown in FIG. 3, the optical scanning device S1 includes the BD sensor 117. The BD sensor 117 has a rectangular light-receiving surface 117a.

Further, the optical scanning device S1 includes the slit 124 which is provided between the rotatable polygonal mirror 115 and the BD sensor 117 and which is used as a regulating means for regulating a light beam L reaching the BD sensor 117. The slit 124 permit passing of the light beam L deflected by each of the reflecting surfaces therethrough. This slit 124 includes at least one wall inclined with respect to the sub-scan direction perpendicular to the main scan direction when a scanning direction of the photosensitive drum with the light beam by the rotation of the rotatable polygonal mirror 115 is the main scan direction.

The slit 124 shown in FIG. 3 is constituted by a first wall 124a which is provided upstream of a light beam passing space with respect to the scanning direction with the light beam L and which is perpendicular to a scanning flat surface (i.e., parallel with Z-axis) and a second wall 124b which is provided downstream of the light beam passing space with respect to the scanning direction with the light beam L and which forms an angle θ between itself and the first wall 124a. That is, the slit 124 includes a first portion AE1 where a slit width with respect to the main scan direction is a first width WE1 and a second portion AE2, different in position from the first portion AE1 with respect to the sub-scan direction, where the slit width with respect to the main scan direction is a second width WE2 different from the first width WE1.

The light beam L includes light beams La, Lb, Lc, Ld reflected by the reflecting surfaces Ma, Mb, Mc, Md, respectively, of the rotatable polygonal mirror 115. In general, the rotatable polygonal mirror 115 causes surface inclination depending on cutting accuracy during manufacturing and accuracy of assembling thereof with the light deflector 116. For this reason, a sub-scan direction (position with respect to the sub-scan direction) of a scanning line varies depending on each of the reflecting surfaces. In the optical scanning device S1, the photosensitive drum is scanned with the light beams La, Lb, Lc substantially at the same sub-scanning position and is scanned with the light beam Ld at a position shifted in an arrow Z direction (sub-scan direction) by a height h1 relative to the light beams La, Lb, Lc. Incidentally, each light beam L forms a spot Φ.

As shown in FIG. 4, received light quantities of the BD sensor 117 when the light-receiving surface 117a is scanned with the light beams La, Lb, Lc are Pa, Pb, Pc, respectively. When the BD sensor 117 receives the light beam providing the received light quantity not less than a threshold Pth, a potential is lowered to "low", so that a BD signal is generated. On the other hand, the BD sensor 117 receives the light beam providing the received light quantity less than the threshold Pth, the potential is increased to "High", so that the BD signal is "OFF". The BD signals by the light beams La, Lb, Lc have BD pulse widths Ta, Tb, Tc, respectively. The BD pulse width is a time width in which the BD signal is in an "ON" (potential "Low") state.

On the other hand, the BD pulse width by the light beam Ld different in sub-scanning position from other light beams La, Lb, Lc is Td. This is because one wall 124b of the slit 124 is inclined by an angle θ relative to the other wall 124a. That is, by this constitution of the slit 124, compared with the light beams La, Lb, Lc, the light beam Ld of which sub-scanning position is shifted in the arrow Z direction by the height h1 is long in time in which the light-receiving surface 117a of the BD sensor 117 is scanned with the light beam Ld. For that reason, the respective BD pulse widths of the 4 reflecting surfaces of the rotatable polygonal mirror 115 are in a relationship of Ta≈Tb≈Tc<Td. That is, the BD pulse width Td has a maximum independent of other pulse widths and therefore can be used as a peculiar value. Incidentally, generation (falling) timing of the BD signal as a reference of an image writing position is unchanged depending on the sub-scanning position of the light beam L since the wall 124a is parallel with the Z-axis. Therefore, image deterioration due to a variation in writing timing does not generate.

The controller 126 in the image forming apparatus D1 identifies the reference surface Facet 1 as the reference surface of the plurality of reflecting surfaces of the rotatable polygonal mirror 115 in the following manner by using the BD pulse width of the light beam passing through the slit 124 and received by the BD sensor 117. The controller 126 first measures the BD pulse widths of the respective reflecting surfaces of the rotatable polygonal mirror 115 before the image formation is effected. In the case where the BD pulse width Td as the peculiar value is detected, scanning at the reflecting surface Md of the rotatable polygonal mirror 115 is recognized. Thus, association between the BD pulse width Td and the reflecting surface Md is made, and on the basis of the association, the reflecting surface Facet 1 can be identified.

According to this embodiment, in a simple constitution such that the slit having a plurality of widths with respect to the sub-scan direction is provided as described above in an optical path leading to the BD sensor, by using the known constitution, the reflecting surface (reference surface) can be identified from the plurality of reflecting surfaces of the rotatable polygonal mirror. As a result, a deviation of the scanning position with the light beam due to accuracy of the rotatable polygonal mirror can be electrically corrected.

Next, a modified embodiment of this embodiment will be described using FIG. 5. Constituent elements similar to those described using FIGS. 3 and 4 are represented by the same reference numerals or symbols and will be omitted from description.

A slit 125 as the regulating means in this modified embodiment is constituted by a first wall 125a and a second wall 125b which are inclined with symmetrical angles θ2 with respect to a rectilinear line (axial line of an axis A parallel with the Z-axis in FIG. 5) perpendicular to the scanning direction with the light beam L. That is, an upstream wall 125a and a downstream wall 125b with respect to the scanning direction which constitute the slit 15 form the symmetrical angles θ2 with respect to the axis A, i.e., the two walls 125a and 125b establish a line-symmetrical relationship. Accordingly, also in the constitution in this modified embodiment, the BD pulse widths by the light beams La, Lb, Lc, Ld provide the relationship of Ta≈Tb≈Tc<Td. That is, it is possible to identify the reflecting surface Facet 1 on the basis of the BD pulse width (peculiar value) Td.

Figure 5:
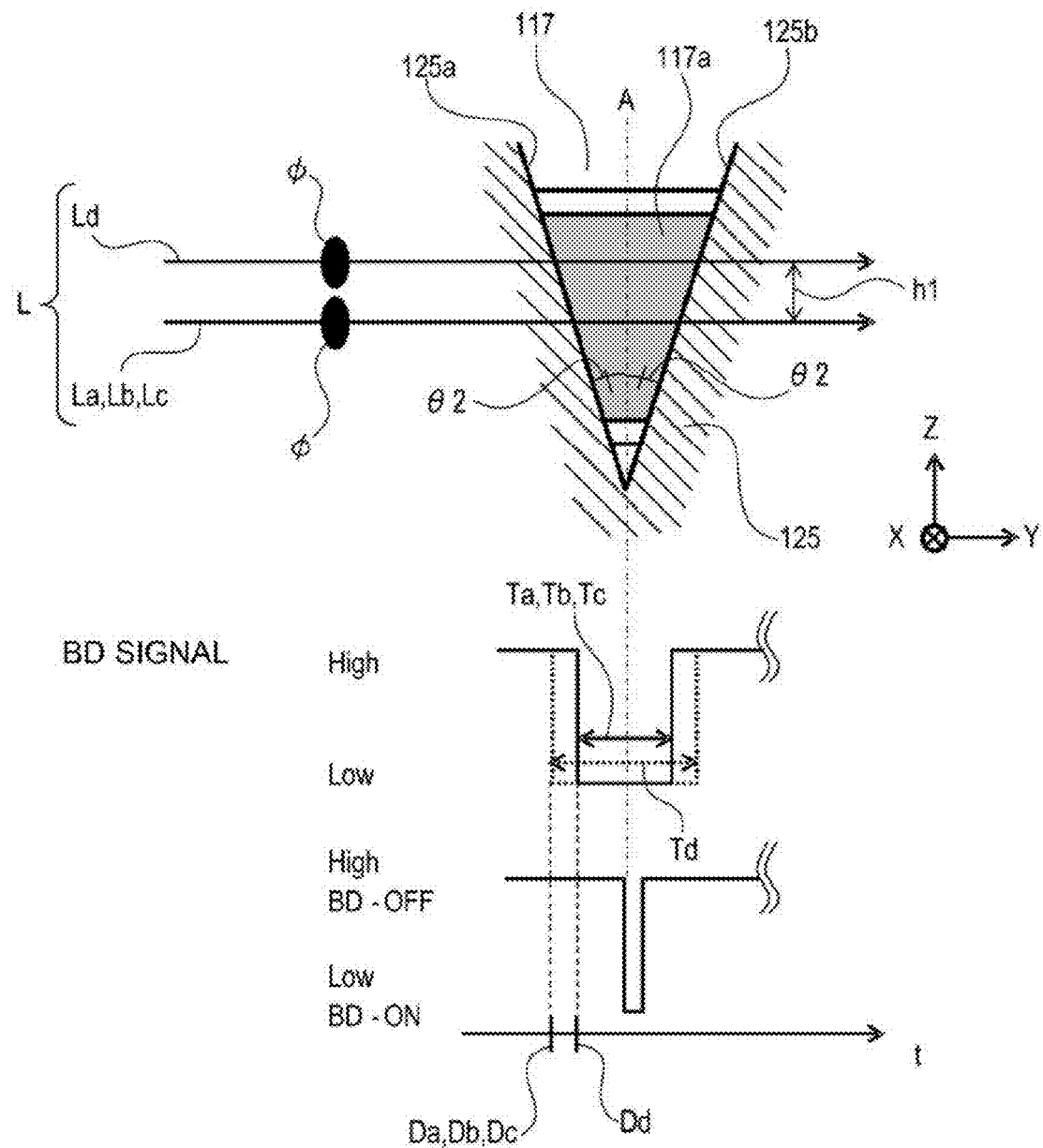
FIG. 5 is an illustration of a structure and a BD signal in a means of First Embodiment.

Further, according to the constitution including the slit 15 shown in FIG. 5, the identification of the reflecting surface Facet 1 may also be made using falling timing values Da, Db, Dc, Dd of the BD signals by the light beams La, Lb, Lc, Ld. As shown in FIG. 5, the falling timing values of the BD signals are in a relationship of Da≈Db≈Dc≠Dd. A difference in time of the BD signal between the respective reflecting surfaces is an independent maximum in a time from Dc to Dd and is an independent minimum in a time from Dd to Da. These values are detected as peculiar values, so that it is also possible to identify the reflecting surface Facet 1.

In the constitution using the slit 125, the BD signals as a reference of the image writing position are generated as separate signals at intermediary times of the BD pulse widths Ta, Tb, Tc, Td and therefore the falling timing values thereof are unchanged depending on the sub-scanning positions of the light beams L. Therefore, the image deterioration due to the variation in writing timing does not generate.

Also in this modified embodiment, by a simple constitution, it is possible to identify the reflecting surface (reference surface) from the plurality of reflecting surfaces of the rotatable polygonal mirror by using the known constitution. As a result, the deviation of the scanning position of the photosensitive drum with the light beam due to the accuracy of the rotatable polygonal mirror can be electrically corrected.

Second Embodiment

Second Embodiment according to the present invention will be described. Constituent elements similar to those described in First Embodiment are represented by the same reference numerals or symbols and will be omitted from description.

In this embodiment, an optical scanning device S1 includes an irradiation position changing means for changing irradiation position of light beams reaching a BD sensor with respect to the sub-scan direction. Specifically, a constitution in this embodiment includes a means for enlarging a deviation amount of the sub-scanning positions of the light beams La, Lb, Lc, Ld as described below.

Figure 6:
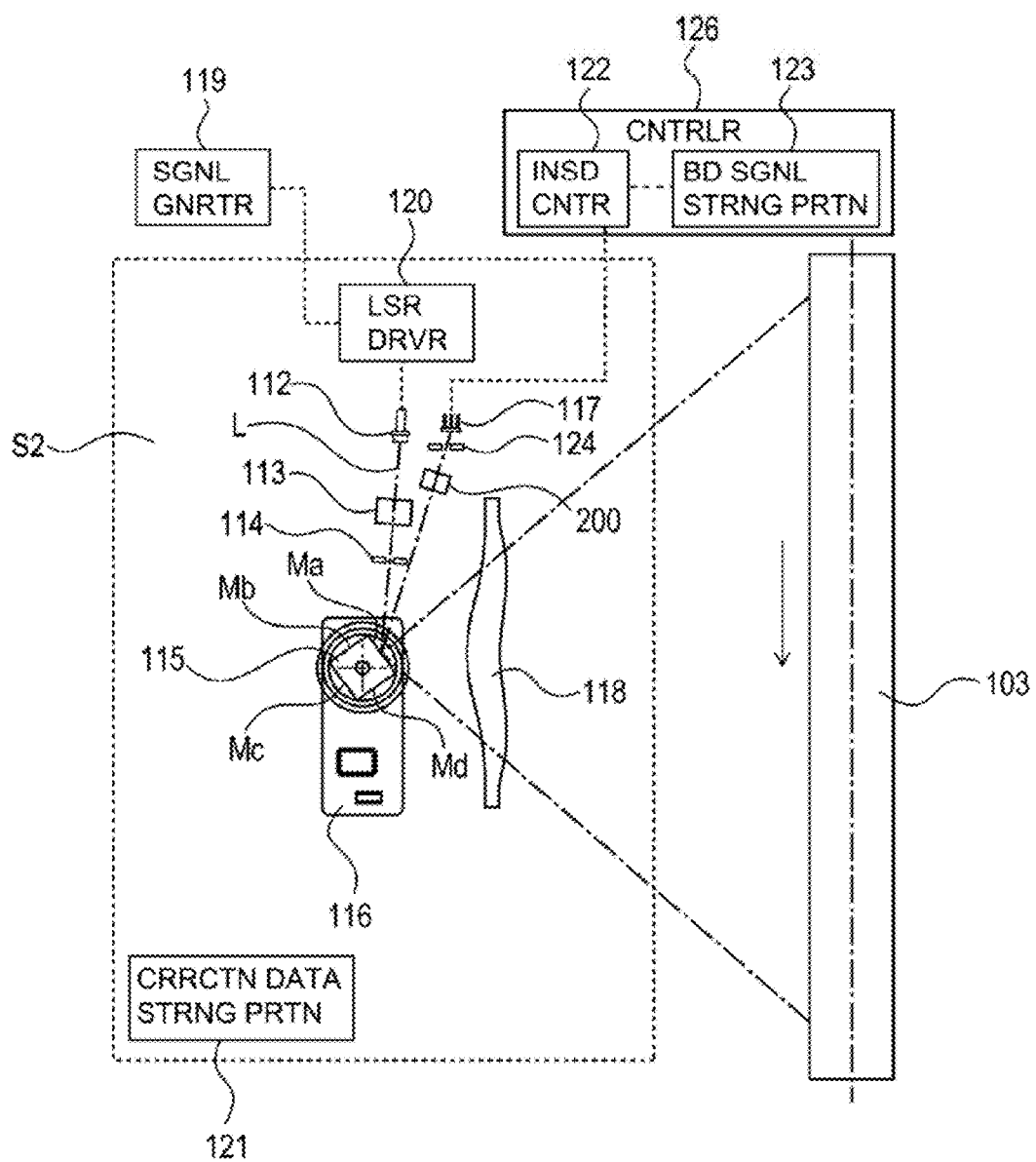
FIG. 6 is a schematic view showing an optical scanning device and an exposure controller in Second Embodiment.

FIG. 6 is an illustration of the optical scanning device S2 in this embodiment. The optical scanning device S2 includes a BD lens 200 which is a concave lens as the irradiation position changing means. This BD lens 200 is provided between the rotatable polygonal mirror 115 and the slit 124.

Figure 7A:
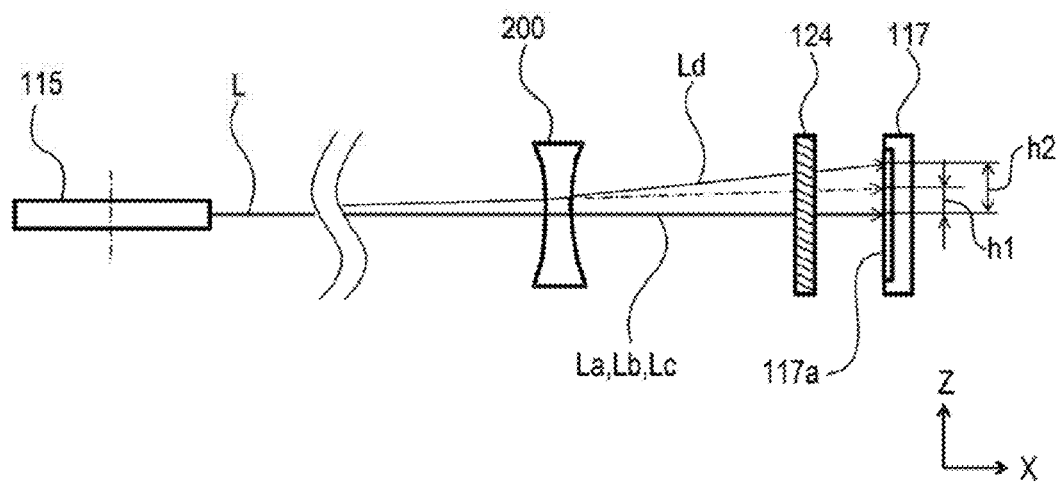
FIGS. 7(a) and 7(b) are illustrations of a structure of a principal part of an optical scanning device in Second Embodiment.
Figure 7B:
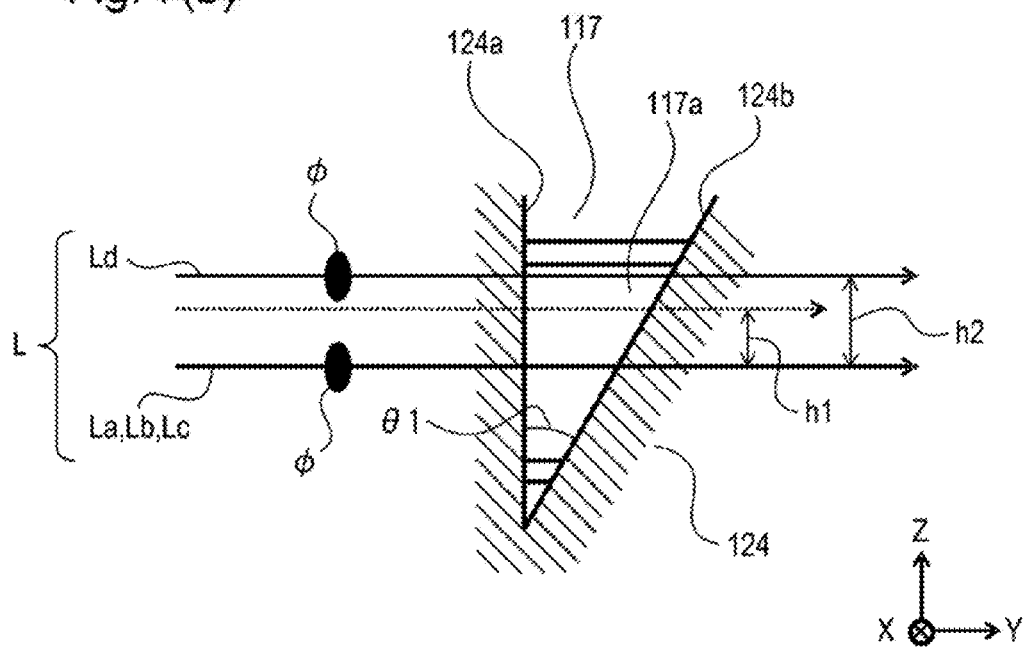

In FIG. 7, (a) shows XZ cross-section of a BD image height, and (b) shows ZY cross-section of the BD image height. As shown in (a) of FIG. 7, the light beam L reflected by the rotatable polygonal mirror 115 passes through the BD lens 200 before enters the BD sensor 117. The light beam Ld different in sub-scanning position from the light beams La, Lb, Lc is refracted in an arrow Z direction by the BD lens 200. That is, the irradiation position of the BD sensor 117 with the light beam Ld is changed to provide a height h2 by the BD lens 200.

Figure 8:
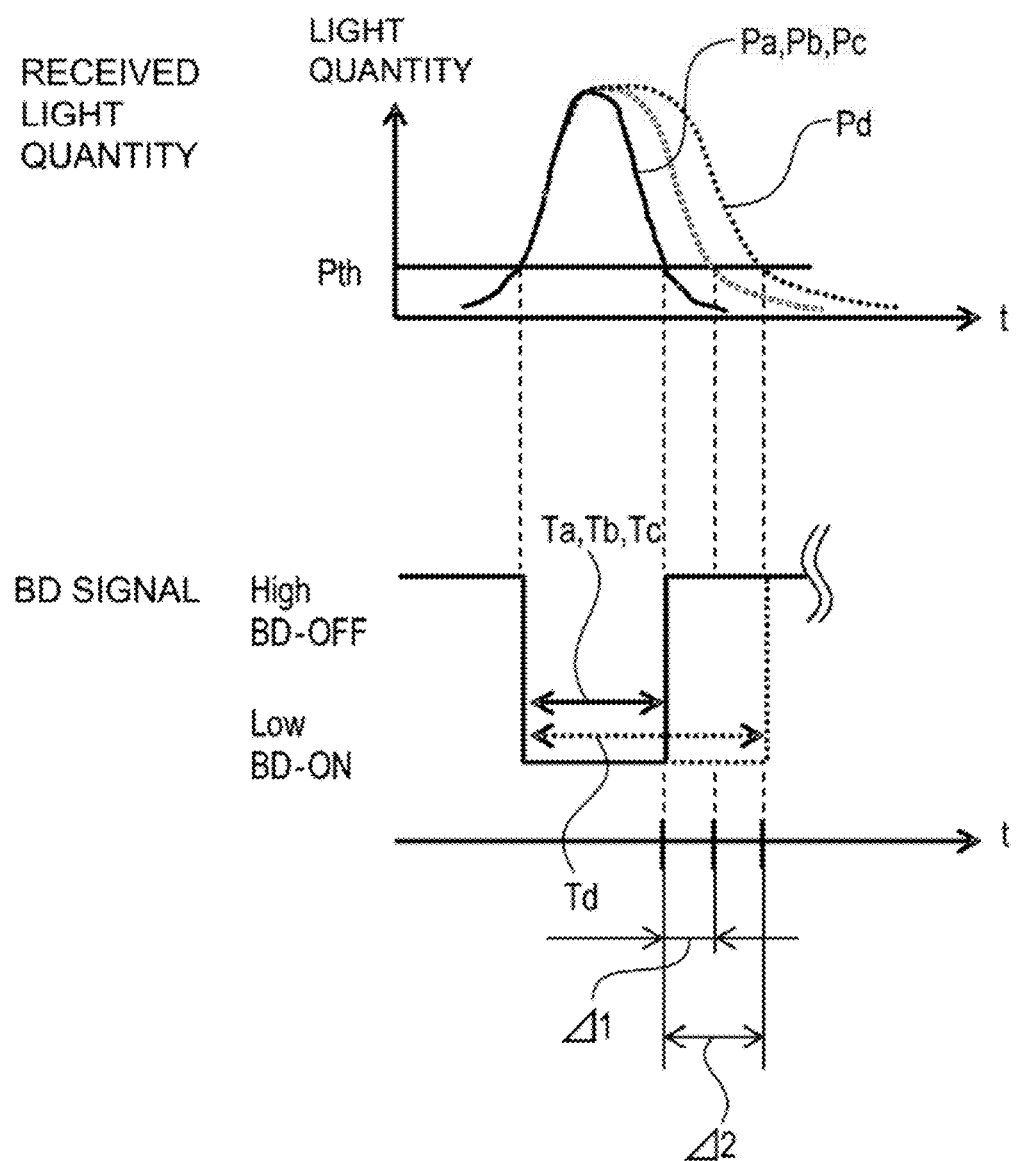
FIG. 8 is an illustration of a BD signal in Second Embodiment.

FIG. 8 shows an effect of this embodiment. A difference value of the BD pulse width Td from the BD pulse widths Ta, Tb, Tc is Δ1 in the optical scanning device S1 which does not include the BD lens 200 but is enlarged to Δ2 in the optical scanning device S2 which includes the BD lens 200. Whether or not the BD pulse width (peculiar value) Td used for association for identifying the reflecting surface Facet 1 is determined by a magnitude relationship between a minimum time difference capable of being detected by the inside counter 122 and the difference value Δ2 of the BD pulse widths. Accordingly, by providing the BD lens 200, identification accuracy of the reflecting surface Facet 1 can be improved.

Figure 9:
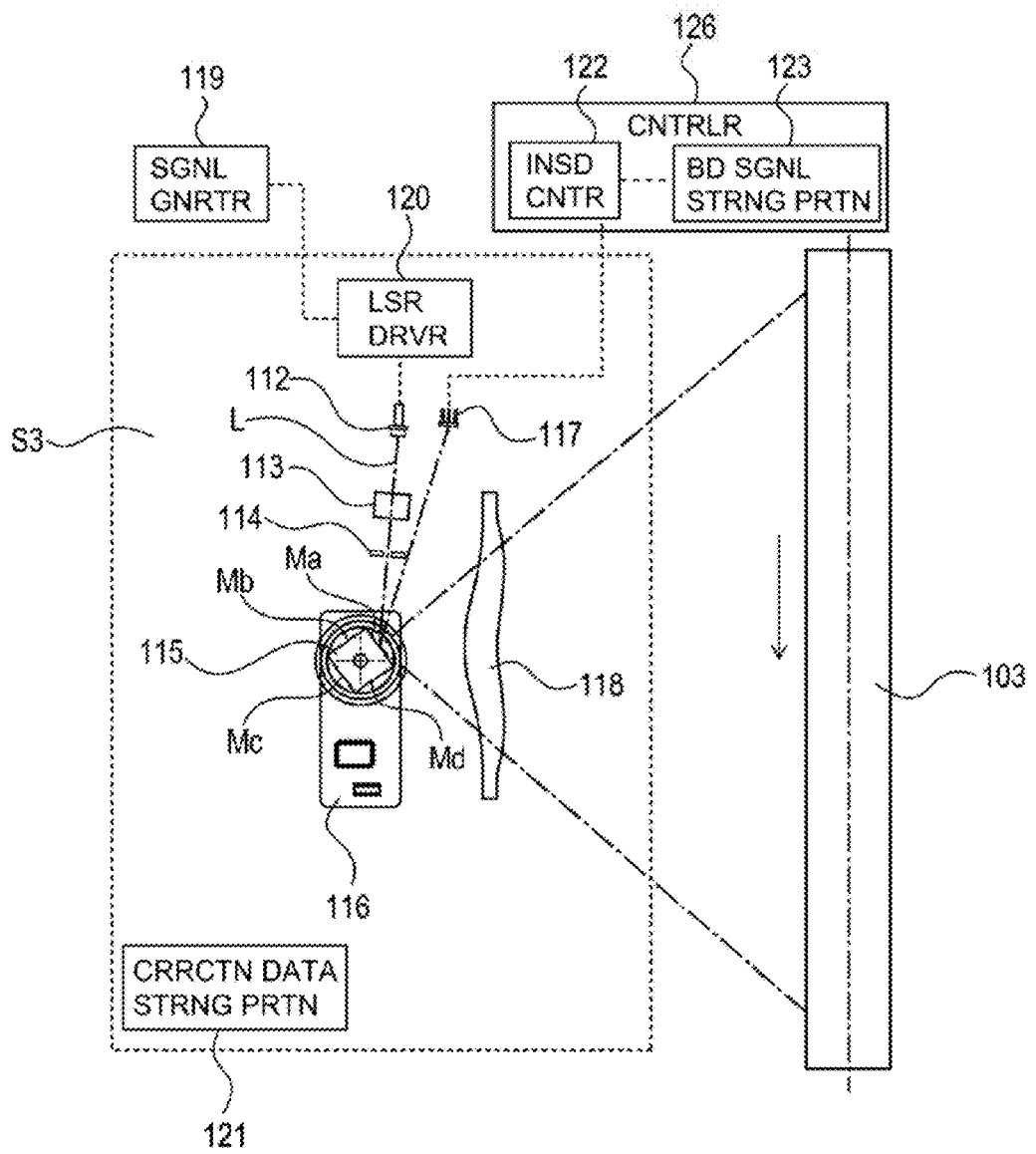
FIG. 9 is a schematic view showing an optical scanning device and an exposure controller in a means of Second Embodiment.

A modified embodiment of this embodiment will be described with reference to FIGS. 9 to 11. FIG. 9 is an illustration of an optical scanning device S3. The optical scanning device S3 has a constitution in which a rotatable polygonal mirror 201 having a plurality of reflecting surfaces is provided but the above-described slit is not provided. In the optical scanning device S3, as the irradiation position changing means, a single reflecting surface of the plurality of reflecting surfaces of the rotatable polygonal mirror is a reflecting surface inclined with respect to a rotational axis of the rotatable polygonal mirror as described below.

Figure 10A:
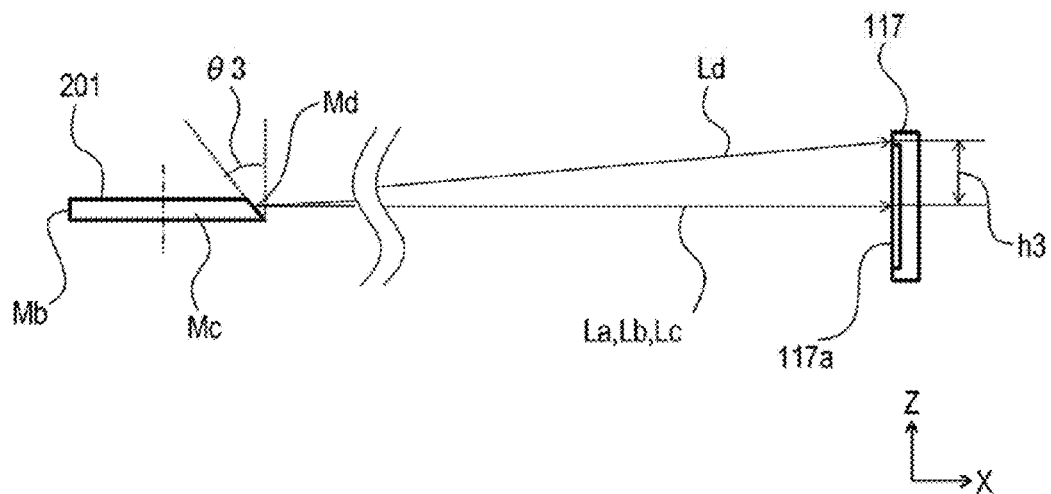
FIGS. 10(a) and 10(b) are illustrations of a structure of a principal part of an optical scanning device in a means of First Embodiment.
Figure 10B:
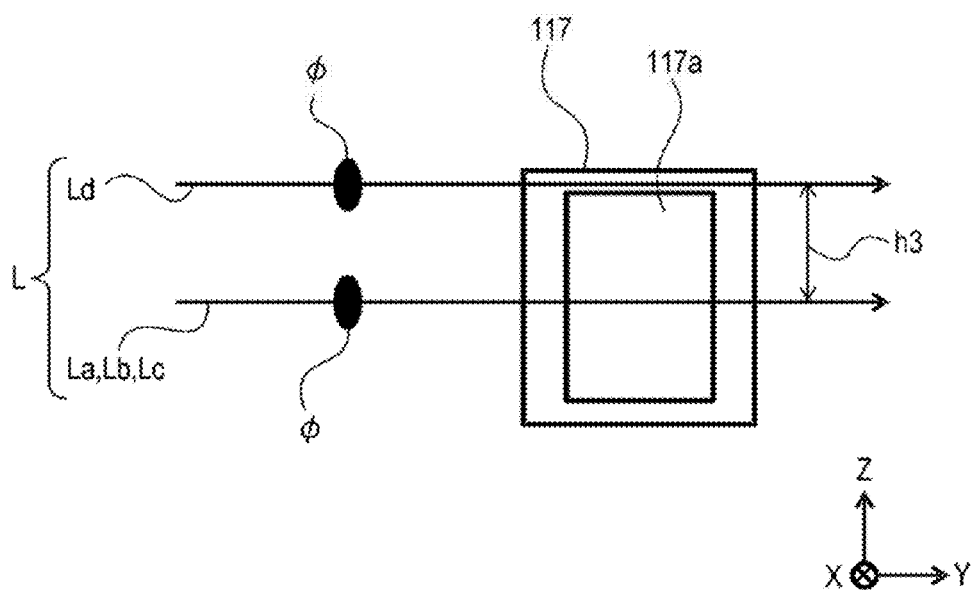

In FIG. 10, (a) shows XZ cross-section of a BD image height, and (b) shows ZY cross-section of the BD image height. As shown in (a) of FIG. 10, the rotatable polygonal mirror 201 has the plurality of reflecting surfaces of which the reflecting surfaces Ma, Mb, Mc are provided in parallel with Z-axis and the reflecting surface Md is provided by being inclined by an angle θ3. As a result, the sub-scanning position of the light beam Ld in the BD sensor 117 shifts relative to other light beams in the arrow Z direction by a height h3. That is, a shift amount of the sub-scanning position of the light beam Ld is enlarged to h3. As shown in (b) of FIG. 10, the light beam Ld is in a positional relationship such that its spot Φ partly deviates from the light-receiving surface 117a of the BD sensor 117, but by adjusting the angle θ3, the sub-scanning position of the light beam Ld can be intentionally determined.

Figure 11:
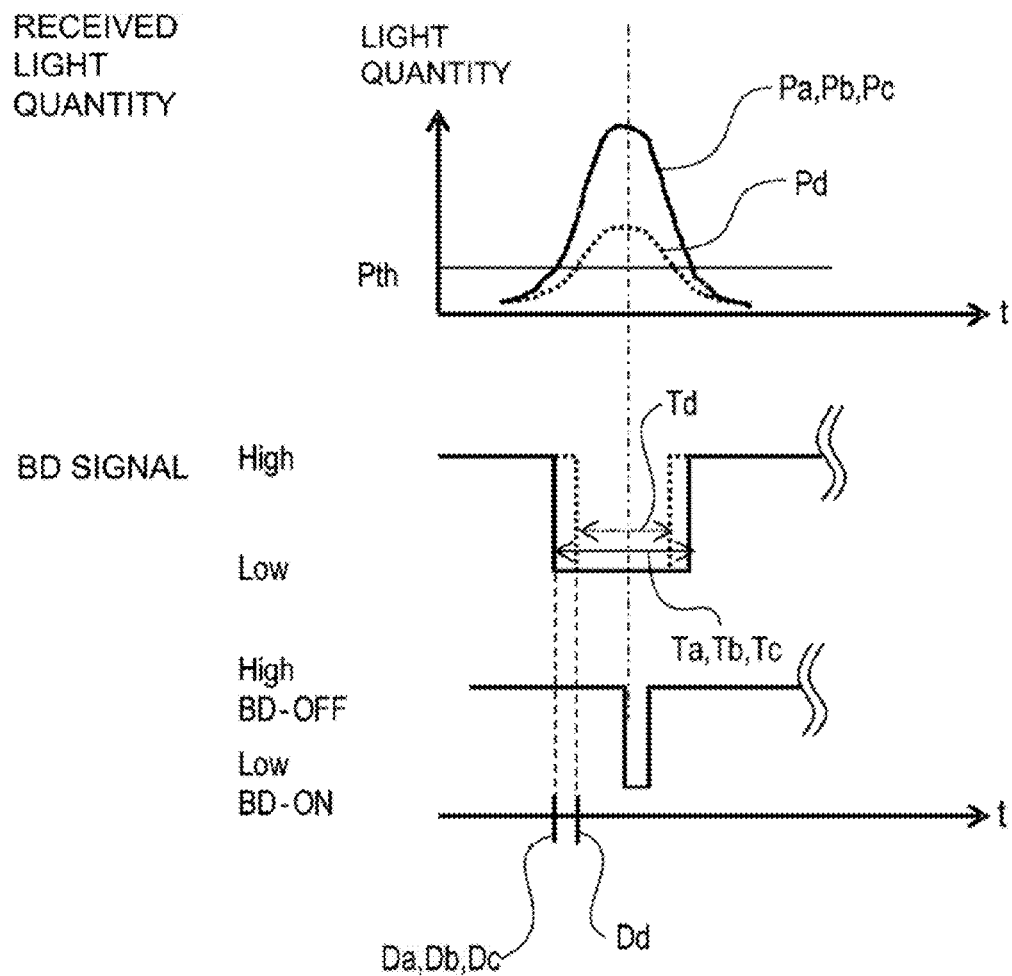
FIG. 11 is an illustration of a BD signal in the means of First Embodiment.

FIG. 11 shows an effect of the modified embodiment of Second Embodiment. The spot of the light beam Ld partly deviates from the light-receiving surface, so that a received light quantity Pd of the light beam Ld by the BD sensor 117 is smaller than received light quantities Pa, Pb, Pc of other light beams. For that reason, the BD pulse widths are in a relationship of Ta≈Tb≈Tc>Td. Accordingly, the BD pulse width Td can be made an independent minimum, i.e., a peculiar value, so that the reflecting surface Facet 1 can be identified on the basis of the peculiar value. Further, falling timing values Da, Db, Dc, Dd are in a relationship of Da≈Db≈Dc≠Dd, and therefore a time difference between the BD signals is used as a peculiar value, and the reflecting surface Facet 1 may also be identified on the basis of the peculiar value.

As described above, the sub-scanning position of the light beam Ld is intentionally determined by controlling the angle θ3 of at least one reflecting surface of the plurality of reflecting surfaces of the rotatable polygonal mirror 201, so that even in the constitution in which the slit is not provided, it becomes possible to identify the reflecting surface Facet 1.

Other Embodiments

In Second Embodiment, the optical scanning device S2 provided with the BD lens 200 as the means for enlarging the sub-scanning position of the light beam L and the optical scanning device S3 provided with the rotatable polygonal mirror 201 having at least one inclined reflecting surface were described. However, the present invention is not limited thereto. A constitution in which the BD lens 200 and the rotatable polygonal mirror 201 having the inclined reflecting surface are used in combination may also be employed.

Further, of the plurality of reflecting surfaces of the rotatable polygonal mirror 201, only one reflecting surface Md is inclined, but the present invention is not limited thereto. The rotatable polygonal mirror may also have a plurality of inclined reflecting surfaces.

Further, the optical scanning device S3 is not provided with the light source, but may also be employ a constitution in which the slit is provided as the regulating means in addition to the constitution including the above-described irradiation position changing means.

In First and Second Embodiments, as the image forming apparatus D1, a monochromatic image forming apparatus was described, but the present invention is not limited thereto. Also in a color image forming apparatus, image formation may only be required to be effected in a manner that information corresponding to each of colors is stored in the correction value data storing portion in advance and then correction values corresponding to the respective reflecting surfaces for the respective colors are set by identifying the reflecting surface by the above-described method. Incidentally, in the color image forming apparatus, by an arrangement or the like of the optical system, the irradiation position deviation amount depends on the accuracy of the rotatable polygonal mirror, so that when a constitution in which the deviation amounts for the respective colors are uniform or the deviation amount for a certain color is associated with that for another color is employed, the correction data stored in the storing portion may be a single data. in the case of any constitution inclusive of the above constitutions, in order to assign the correction value data depending on the respective reflecting surfaces with accuracy, as described above, the constitution for identifying the reflecting surface may only be required to be employed.

Further, in First and Second Embodiments, the constitutions in which the scanning surfaces and the BD signals (BD pulse widths, the time difference between the BD signals) are associated with each other were described, but the present invention is not limited thereto. When the reflecting surface Facet 1 can be identified using the sub-scanning position of the scanning line, a similar effect can be obtained, and therefore the parameter associated with the scanning surface is not limited to the BD signal, but for example, a constitution in which the sub-scanning position is directly detected using a line sensor or the like may also be employed.

In First and Second Embodiments, the constitution using the BD pulse width Td and the constitution using the time difference in BD falling timing between the respective reflecting surfaces were described, but the present invention is not limited thereto. The peculiar value may only be required to be identified. For example, a time difference in BD rising timing between the respective reflecting surfaces may also be used.

Further, in First and Second Embodiments, the constitutions in which the BD pulse width Td and the time difference in BD falling timing between the respective reflecting surfaces are independent maximum or independent minimum were described, but the present invention is not limited thereto. The peculiar value may only be required to be identified. For example, an algorithm for identification such that a difference value between the BD pulse widths Ta, Tb, Tc, Td is calculated may also be used.

Further, in First and Second Embodiments, for clarification of explanation, the constitution in which only the light beam Ld is different in sub-scanning position from other light beams La, Lb, Lc was described. However, the sub-scanning positions of the light beams La, Lb, Lc, Ld varies depending on individuals of the rotatable polygonal mirrors 115, 201, and therefore the constitution is not limited to the above-described constitution.

Shapes of the light-receiving surfaces of the BD sensor and the slits are not limited to those in First and Second Embodiments. When the sub-scanning position of the scanning line can be detected using the BD signal, any constitution may also be employed. For example, a plurality of slits or a plurality of light-receiving surfaces of the BD sensor may also be provided.

The BD signal generating methods are not limited to those in First and Second Embodiments. The threshold Pth may also be variable depending on the received light quantity. Further, the BD signal as the basis of the image writing position may also be generated as a separate signal on the basis of information on the plurality of light-receiving surfaces.

The constitution in which the number of surfaces (reflecting surfaces) of the rotatable polygonal mirrors 115, 201 is 4 was described as an example, but the number of the reflecting surfaces is not limited thereto.

Further, the shape of the spot is not limited to that of the spot Φ.

By the above-described means, it is possible to identify the reflecting surface of the rotatable polygonal mirror simply and in a short time without increasing the number of parts by using the known elements ordinarily used in the optical scanning device. Further, by using the correction value associated with the identified reflecting surface, the image defect as the problem of the image forming apparatus can be easily solved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232708 filed on Nov. 30, 2015, which is hereby incorporated by reference herein in its entirety.

What is claimed is:

1. An image forming apparatus comprising:
an optical scanning unit configured to scan a photosensitive member with a light beam, wherein said optical scanning unit includes:
  a rotatable polygonal mirror configured to deflect the light beam emitted from a light source;
  a detecting portion configured to detect the light beam deflected by said rotatable polygonal mirror;
  a slit provided between said rotatable polygonal mirror and said detecting portion and configured to regulate the light beam toward said detecting portion; and
  a concave lens provided between said rotatable polygonal mirror and said slit and configured to change an irradiation position of the light beam reaching said detecting portion; and
a controller configured to control, on the basis of a detected signal by said detecting portion, a scanning start position of the photosensitive member with the light beam deflected by said rotatable polygonal mirror,
wherein said slit includes a first portion where a slit width is a first width with respect to a main scan direction and a second portion, different in position from the first portion with respect to a sub scan direction, where the slit width is a second width different from the first width with respect to the main scan direction, and
wherein said controller identifies one of reflecting surfaces of said rotatable polygonal mirror as a reference surface on the basis of a plurality of detected signals acquired by detecting a plurality of light beams that are reflected by the respective reflecting surfaces and that pass through said slit.

2. The image forming apparatus according to claim 1, wherein said slit is constituted by two walls that oppose each other and that are non parallel with each other.

3. The image forming apparatus according to claim 2, wherein said slit is constituted by a first wall parallel with the sub scan direction and a second wall non parallel with the sub scan direction.

4. The image forming apparatus according to claim 2, wherein the two walls are a first wall and a second wall that are line symmetrical to each other.

5. The image forming apparatus according to claim 1, wherein said detecting portion is a line sensor.

* * * * *